United States Patent [19]

Sauvage et al.

[11] Patent Number: 5,376,269
[45] Date of Patent: Dec. 27, 1994

[54] INSTALLATION FOR SKIMMING A VAT

[75] Inventors: René Sauvage, Eulmont; Gérard Schaaff, Laitre s/Amance, both of France

[73] Assignee: NORDON et Cie, France

[21] Appl. No.: 85,148

[22] Filed: Jul. 2, 1993

Related U.S. Application Data

[63] Continuation of Ser. No. 789,846, Nov. 12, 1991, abandoned.

[30] Foreign Application Priority Data

Nov. 12, 1990 [FR] France ................ 90 13995

[51] Int. Cl.⁵ .............................. B01D 21/06
[52] U.S. Cl. ...................... 210/387; 210/391; 210/530
[58] Field of Search ............... 210/387, 391, 393, 400, 210/401, 525, 528–530

[56] References Cited

U.S. PATENT DOCUMENTS

| | | | |
|---|---|---|---|
| 1,957,185 | 5/1934 | Weber et al. | 210/55 |
| 2,613,810 | 10/1952 | Lorenz | 210/51 |
| 2,780,361 | 2/1957 | Evans et al. | 210/51 |
| 4,481,118 | 11/1984 | Heissenberger et al. | 210/400 |
| 4,594,156 | 6/1986 | Grujanac et al. | 210/530 |
| 4,822,487 | 4/1989 | Soich | 210/470 |

FOREIGN PATENT DOCUMENTS

| | | |
|---|---|---|
| 728155 | 10/1942 | Germany . |
| 1140905 | 12/1962 | Germany . |
| 2013421 | 11/1971 | Germany . |
| 2359477 | 7/1974 | Germany . |
| 3322624 | 3/1985 | Germany . |
| 9000723 | 5/1990 | Germany . |
| 795992 | 6/1958 | United Kingdom . |
| 886912 | 1/1962 | United Kingdom . |
| 1026414 | 4/1966 | United Kingdom . |

Primary Examiner—Ivars Cintins
Attorney, Agent, or Firm—Larson and Taylor

[57] ABSTRACT

An installation for skimming a vat 1, having a sweeping filter screen 2 whose vertical plane can be rotated so that its bottom edge sweeps the top surface of the contents of the vat 1 so as to remove scum by pushing it towards a spillway 5.

16 Claims, 3 Drawing Sheets

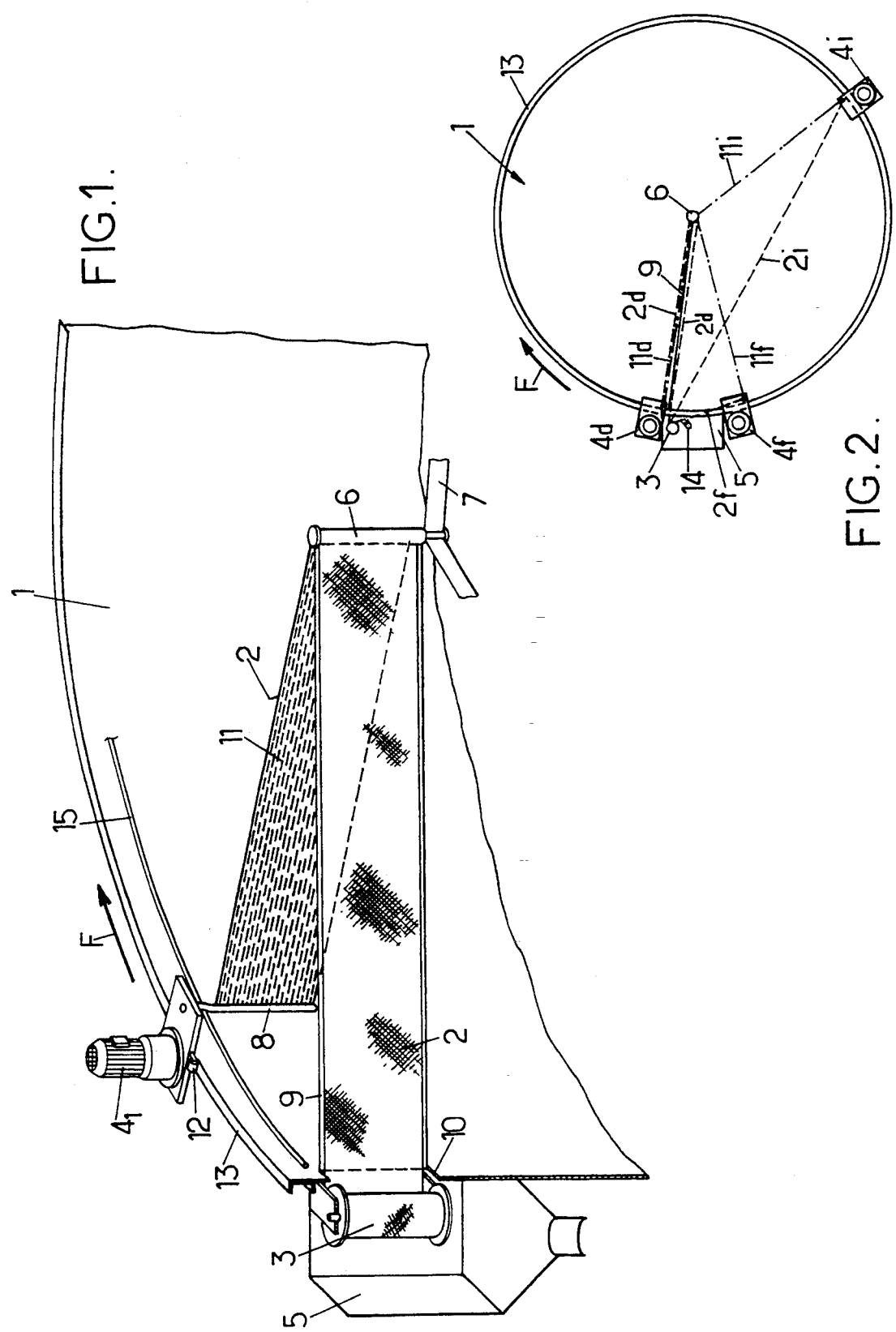

INSTALLATION FOR SKIMMING A VAT

This application is a continuation of application Ser. No. 07/789,846 filed Nov.12, 1991, now abandoned.

The present invention relates to an installation for skimming a vat, i.e. an installation for separating a liquid contained in the vat and a layer of supernatant matter, foam or the like.

An application of the invention lies in malting, to skim vats in which barley is soaked, or in any other type of food industry where ever more strict hygiene requirements require the supernatant scum or foam or any other matter floating on the surface of a liquid contained in a vat to be separated therefrom under conditions of extreme cleanliness.

The object of the present invention is to achieve this result without consuming large quantities of water and by means of a system that is easily automated.

To this end, an installation of the invention for skimming a vat is essentially characterized in that it comprises a sweeping filter screen whose vertical plane can be rotated so that its bottom edge sweeps the top surface of the contents of the vat so as to remove scum by pushing it towards a spillway.

Advantageously, said filter screen is tensioned between drive means and a reel for winding it in and paying it out. In particular, provision may be made for the reel to be disposed at the periphery of the vat, and for said drive means to be arranged to move along said periphery.

In one embodiment, said filter screen passes over a central pivot of the vat.

In any event, it is also advantageous further to provide for the installation to include means for cleaning said screen.

Two embodiments of the installation are described below by way of non-limiting example and with reference to the figures of the accompanying drawings, in which:

FIG. 1 is a fragmentary perspective view of a first embodiment of the invention;

FIG. 2 is a diagrammatic plan view of said first embodiment;

Figure 3:
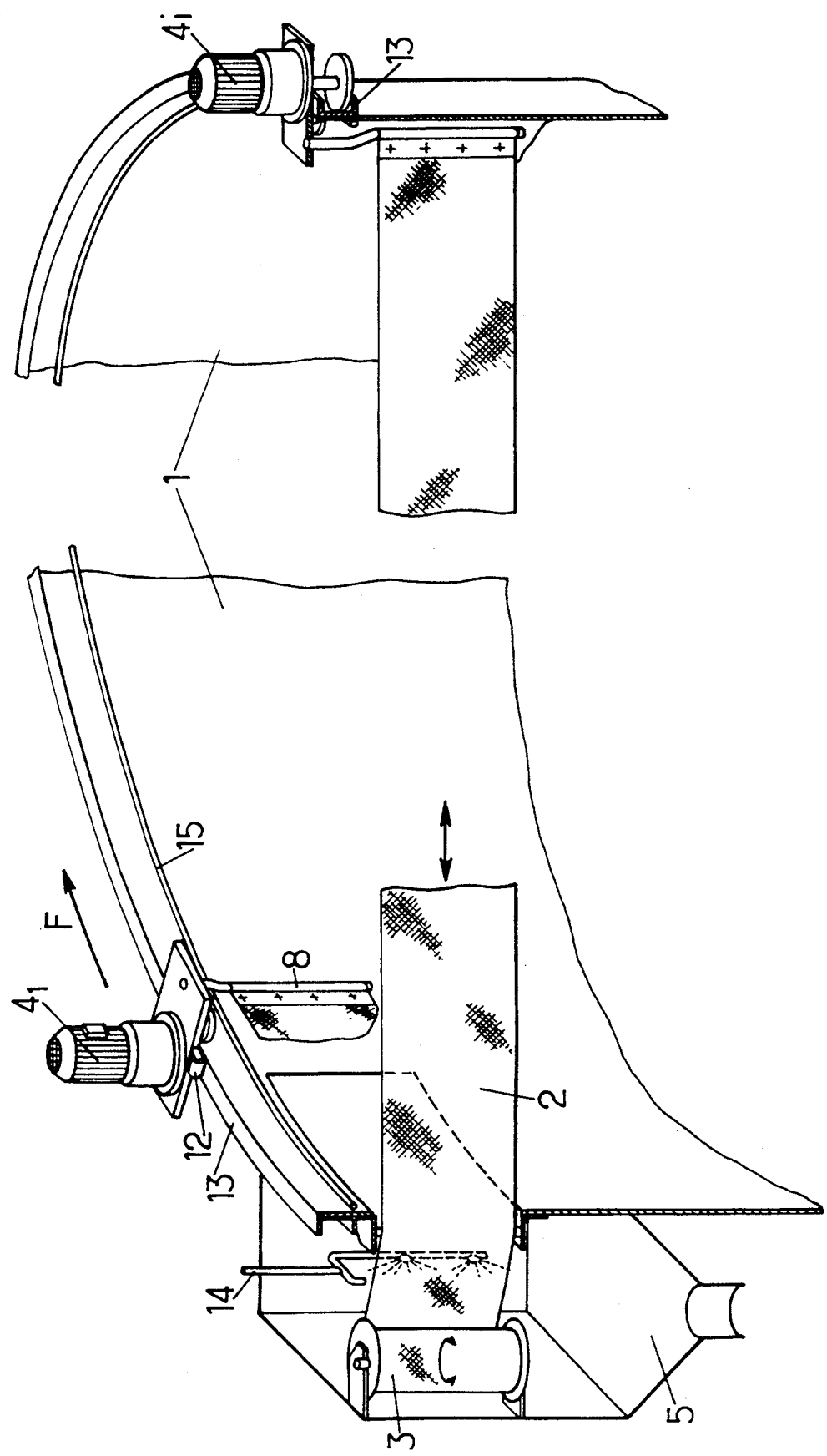
FIG. 3 is a fragmentary perspective view of a second embodiment.

In the various figures, 1 designates a vat, e.g. for use in malting and assumed to be cylindrical, and 2 designates a filter screen. A reel for winding in and paying out the screen is referenced 3, and drive means are referenced 4, with indices $d$, 1, 2, $i$, and $f$ designating various positions of the drive means. Reference 5 designates a spillway for removing scum or other floating matter to be separated from the liquid contained in the vat.

In the embodiment shown in FIGS. 1 and 2, the vat 1 is fitted with a central pivot 6 mounted on a support arm 7. The screen 2 is thus tensioned vertically over the top of the vat between the reel 3 and a vertical bar 8 secured to the drive means 4, and it passes over the central pivot 6. The central pivot also serves as a bearing point for a fixed radial solid metal sheet 9 connected to the side wall of the vat immediately downstream from an overflow notch 10 in communication with the spillway 5, and for a moving perforated metal sheet 11 or scraper sheet supported at its other end by the vertical bar 8 and disposed behind the screen 2.

The indices $d$, $i$, and $f$ are used for distinguishing different positions of the moving sheet 11 and of the screen 2.

The drive means 4 are advantageously constituted by an electric motor, and are capable of moving around the periphery of the vat 1 in the direction of arrow F (while skimming) because of wheels 12 or the like running without slipping on a drive path 13, e.g. by means of a rack-and-pinion system.

This embodiment operates as follows.

The starting position of the drive means is referenced $4d$ in FIG. 2. The fixed sheet 9 and the moving sheet $11d$ are back-to-back. The filter screen 2 runs around them along the path 8-6-3. Once the drive means are put into motion to move in the direction of arrow F, the moving scraper sheet 11 and the filter screen 2 move in the same direction, pushing before them the foam or other supernatant bodies. Until the moment the drive means 4 reach a position on the periphery of the vat 1 which is substantially diametrically opposite to the reel 3, the reel is practically inactive since the active length of screen 2 remains substantially equal to the diameter of the vat.

However, thereafter, the filter screen 2 disengages the perforated moving sheet 11 (see intermediate position $4i$–$11i$ in FIG. 2) and the reel 3 is actuated to wind in the screen so as to keep it under tension, since the active length thereof now decreases continuously until the final position $2f$ is reached.

In the intermediate position shown in FIG. 2, it will be understood that the floating matter to be removed still lies ahead of the screen $2i$ (towards the bottom of the figure), and naturally that it remains there until the final position $2f$ in which the length of the non-wound-in screen is at a minimum. It will be understood that with this installation, all of the foam or other matter can be removed via the notch 10 into the spillway 5.

The motor (not shown) of the reel 3 is then declutched and the drive means 4 are driven in the opposite direction to arrow F so as to return both the moving sheet 11 and the screen 2 to the starting position referenced by the indices $d$. During this return stroke, the filter screen 2 is backwashed with water and is thus cleaned as it is paid out by means of a cleaning strip of nozzles 14 disposed close to the reel 3, with reference 15 designating a strip of nozzles for cleaning the vat 1.

In a variant, the screen could be cleaned during the go stroke while it is being wound in. Instead of being fixed, the strip of nozzles for cleaning the vat could be a moving strip extending parallel to the axis of the vat and moving close to its wall.

Naturally, all the operating stages and operations described above could easily be automated.

Figure 4:
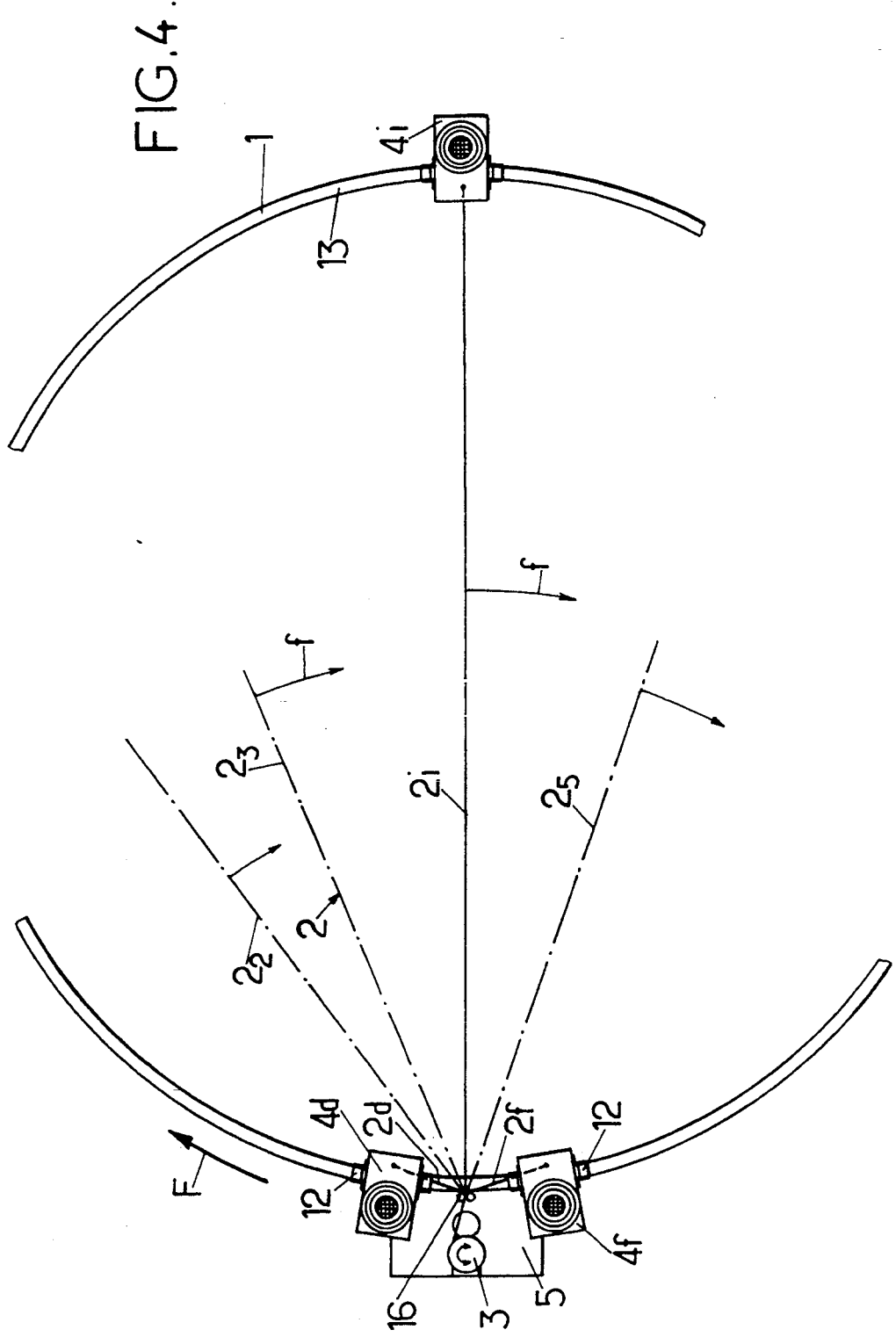
FIG. 4 is a diagrammatic plan view of said second embodiment.

The variant embodiment described with reference to FIGS. 3 and 4 is simplified in that the filter screen 2 is now tensioned directly between guides 16 associated with the reel 3 and with the drive means 4, without there being a moving radial sheet or a fixed sheet. Nevertheless, these figures use the same references as are used in FIGS. 1 and 2 for designating the other components that are common to both embodiments, so there is no need to describe them again.

In FIG. 4, successive positions of the filter screen 2 during a skimming stage are referenced $2d$, $2i$, $2f$, with the screen then moving in the direction of arrows $f$. It can be seen that out to the intermediate position $4i$ of the drive means (diametrically opposite to the guides 16), the screen 2 is paid out from the reel. 3 which is declutched from its own drive motor. Thereafter, the length of screen must be reduced between 2i and 2f, and this is obtained by applying positive drive to the reel 3 in the winding-in direction.

Naturally, as in the preceding embodiment, as it moves, the screen 2 pushes the floating matter to be removed in front of it to the notch which communicates with the spillway 5.

It should be observed that water may be delivered to the vat in order to bring the matter to be removed up to the level of the notch 10, as in the first embodiment.

In the second embodiment as described above, it can be seen that by returning the drive means 4 from the position 4f to the position 4d in the opposite direction to arrow F, another skimming operation can be performed. It is also possible to return the screen 2 to its initial position 2d without skimming and while washing it, as in the first embodiment.

We claim:

1. An installation comprising a vat containing a liquid and means for skimming said vat mounted on said vat, said skimming means comprising:
a vertical sweeping filter screen having an adjustable length connected to rigid support means for maintaining the screen in a vertical plane, said filter screen also being connected to motorized drive means for driving one end of said screen about the periphery of the vat so that a bottom edge of the filter screen sweeps the top of said liquid in the vat, thus removing scum by pushing it towards a spillway which communicates with an overflow notch disposed at the periphery of the vat.

2. An installation according to claim 1, wherein the vat is cylindrical and the motorized drive means drives the filter screen in rotation in the vat.

3. An installation according to claim 2, wherein the vat is provided with a radially-extending, fixed, vertical solid sheet which, taken in the direction of rotation of said filter screen, terminates immediately downstream said overflow notch.

4. An installation according to claim 3, wherein said support means comprise a central pivot around which said filter screen passes for a portion of its movement in rotation about the vat.

5. An installation according to claim 4, wherein said central pivot serves as a support both for said fixed sheet and for a moving vertical perforated sheet which also extends radially and which is connected to said motorized drive means so as to be capable also of travelling over the surface in the vat behind said sweeping filter screen.

6. An installation according to claim 1, wherein said vertical filter screen is tensioned between said motorized drive means and a reel of said support means for winding it in and paying it out.

7. An installation according to claim 6, wherein the reel is disposed at the periphery of the vat, and said motorized drive means are arranged to move along said periphery.

8. An installation according to claim 6, including fixed nozzle means for automatically cleaning said filter screen when is paid out from said reel.

9. An installation according to claim 1, wherein said filter screen is tensioned directly between a reel of said support means and said drive means.

10. An installation according to claim 9, wherein the vat is cylindrical and the motorized drive means drives the filter screen in rotation about said vat.

11. An installation according to claim 10, wherein the reel is stationarily mounted at one point on the periphery of the vat such that as the motorized drive means moves the other end of the filter screen about the periphery of the vat, the filter screen is maintained in a straight line as it sweeps the top surface of the liquid in the vat.

12. An installation comprising a vat containing a liquid and means for skimming said vat mounted on said vat, said skimming means comprising:
a vertical sweeping filter screen connected to support means for maintaining the screen in a vertical plane, said filter screen also being tensioned between a reel of said support means for winding the screen in and paying it out and a drive means for driving one end of said screen about the periphery of the vat so that a bottom edge of the filter screen sweeps the top of said liquid in the vat, thus removing scum by pushing it towards a spillway which communicates with an overflow notch disposed at the periphery of the vat.

13. An installation according to claim 12, wherein the reel is disposed at the periphery of the vat, and said drive means are arranged to move along said periphery.

14. An installation comprising a vat containing a liquid and means for skimming said vat mounted on said vat, said skimming means comprising:
a vertical sweeping filter screen connected to support means for maintaining the screen in a vertical plane, said filter screen also being tensioned directly between a reel of said support means and a drive means for driving one end of said screen about the periphery of the vat so that a bottom edge of the filter screen sweeps the top of said liquid in the vat, thus removing scum by pushing it towards a spillway which communicates with an overflow notch disposed at the periphery of the vat.

15. An installation according to claim 14 wherein the vat is cylindrical and the drive means drives the filter screen in rotation about said vat.

16. An installation according to claim 15 wherein the reel is stationarily mounted at one point on the periphery of the vat such that as the drive means moves the other end of the filter screen about the periphery of the vat, the filter screen is maintained in a straight line as it sweeps the top surface of the liquid in the vat.

* * * * *